(12) United States Patent
Schindzielorz

(10) Patent No.: US 8,778,130 B2
(45) Date of Patent: Jul. 15, 2014

(54) AIRBAG

(75) Inventor: Michael Schindzielorz, Kernersville, NC (US)

(73) Assignee: Highland Industries, Inc., Greensboro, NC (US)

( * ) Notice: Subject to any disclaimer, the term of this patent is extended or adjusted under 35 U.S.C. 154(b) by 0 days.

(21) Appl. No.: 13/367,269

(22) Filed: Feb. 6, 2012

(65) Prior Publication Data

US 2012/0132364 A1 May 31, 2012

Related U.S. Application Data

(62) Division of application No. 12/318,966, filed on Jan. 13, 2009, now Pat. No. 8,132,826.

(60) Provisional application No. 61/006,445, filed on Jan. 14, 2008.

(51) Int. Cl.
*B32B 37/12* (2006.01)
*B32B 38/08* (2006.01)

(52) U.S. Cl.
USPC .......................................... 156/329

(58) Field of Classification Search
USPC .......................................... 156/329
See application file for complete search history.

(56) References Cited

U.S. PATENT DOCUMENTS

| | | | |
|---|---|---|---|
| 5,006,372 A | 4/1991 | Wolfer et al. | |
| 5,863,625 A | 1/1999 | Chiou | |
| 6,550,890 B2 | 4/2003 | Saijo | |
| 6,886,857 B1 | 5/2005 | Mishina et al. | |
| 2002/0020992 A1 | 2/2002 | Kanuma | |
| 2004/0096673 A1* | 5/2004 | Aketa et al. | 428/447 |
| 2004/0222618 A1 | 11/2004 | Azechi et al. | |
| 2005/0234181 A1* | 10/2005 | Ikeno et al. | 524/493 |
| 2006/0046077 A1 | 3/2006 | Howe et al. | |
| 2006/0163853 A1 | 7/2006 | Keshavaraj | |
| 2006/0205908 A1 | 9/2006 | Laur et al. | |

FOREIGN PATENT DOCUMENTS

| | | |
|---|---|---|
| CN | 1662310 A | 8/2005 |
| EP | 1 736 378 B1 | 12/2006 |
| JP | 2004-161155 | 6/2004 |
| JP | 2005-313877 | 11/2005 |
| JP | 11227550 | 12/2006 |
| JP | 2007-038693 | 2/2007 |
| WO | WO 2007/070465 A2 | 6/2007 |
| WO | WO 2007070465 A2 * | 6/2007 |

OTHER PUBLICATIONS

Communication in EP Appln No. 09701826.1 dated Aug. 25, 2011.
Office Action in CN Appln No. 200980101983.5 dated Feb. 29, 2012.
Notification of Reasons of Refusal in JP Appln No. 2010-542288 dated Feb. 6, 2012.

* cited by examiner

*Primary Examiner* — Michael Orlando
*Assistant Examiner* — Daniel Lee
(74) *Attorney, Agent, or Firm* — Foley & Lardner LLP

(57) ABSTRACT

An airbag is disclosed that comprises a first fabric layer, a second fabric layer, and an adhesive. The first and second fabric layers are coated with silicone elastomer coatings. The adhesive is a heat-cured silicone adhesive, and forms a seam-bond between the first and second layers such that a bag-like structure is created.

13 Claims, 5 Drawing Sheets

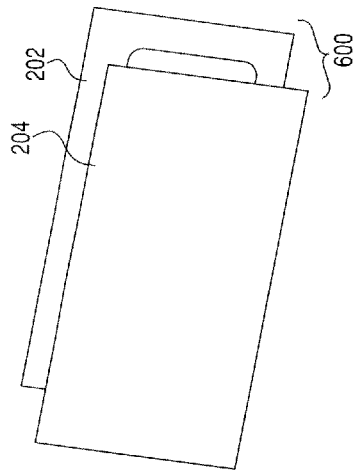
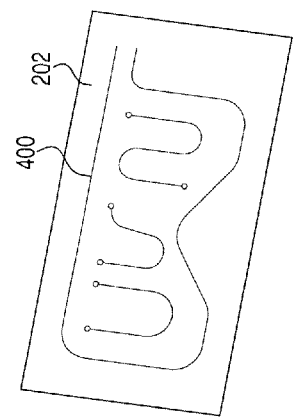
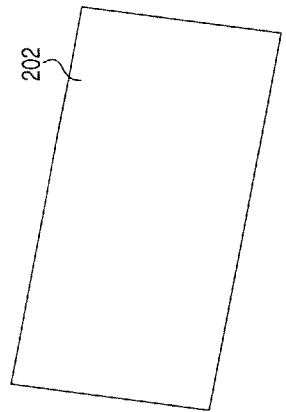
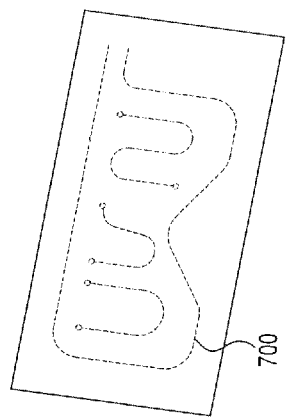
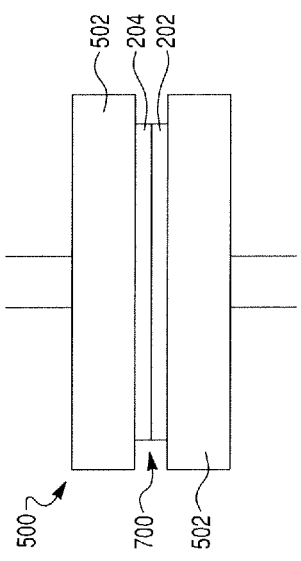

AIRBAG

CROSS-REFERENCE TO RELATED PATENT APPLICATIONS

This application is a Divisional of U.S. patent application Ser. No. 12/318,966, filed Jan. 13, 2009, which claims priority from U.S. Provisional Application No. 61/006,445, filed Jan. 14, 2008. The contents of these applications are incorporated herein by reference in their entirety.

BACKGROUND

The present invention relates to an airbag module comprising a heat-cured silicone sealant as a mechanism for attachment, and a method of making the airbag module.

Airbags typically include two or more stacked fabric layers that are attached to each other so as to make a bag-like structure capable of being filled by gas from a gas inflator when the airbag is deployed during a crash event. The fabric layers are made impermeable to gas leaks using an elastomeric coating. The attachment mechanism between the two coated layers also include a sealing mechanism so as to create a seal between the fabric layers such that that the gas from the inflator does not leak out from between the layers.

In some conventional airbags, the method of manufacturing includes the steps providing a first fabric layer which has a gas-impermeable coating, applying a sealant along a pattern in which the seams of the airbag are to be formed, disposing a second fabric layer with a gas-impermeable coating onto the first coated fabric layer such that the sealant is located between the two layers, compressing the first and second layers, allowing the first and second layers to cure for 24 hours in ambient temperature, and sew or stitch the first and second layers together along the sealant pattern. This process is time consuming because of the 24 hour (or more) curing time for the sealant and laborious because of the sewing process.

SUMMARY

According to one embodiment of the present invention, an airbag may comprise a first fabric layer coated with a first silicone elastomer coating; a second fabric layer coated with a second silicone elastomer coating; and a heat-cured silicone adhesive. The heat-cured silicone adhesive may form a seam-bond between the first and second layers such that a bag-like structure is created.

According to another embodiment of the present invention, an occupant safety module may comprise a gas inflator and an airbag in fluid communication with the gas inflator. The airbag may comprises a first fabric layer coated with a first silicone elastomer coating; a second fabric layer coated with a second silicone elastomer coating; and a heat-cured silicone adhesive. The heat-cured silicone adhesive may fowl a seam-bond between the first and second layers such that a bag-like structure is created.

According to another embodiment of the present invention, a method of manufacturing an airbag may comprise providing a first fabric layer coated with a first silicone elastomer coating; applying a heat-cured silicone adhesive to the first fabric layer; providing a second fabric layer coated with a second silicone elastomer coating on the coated first fabric layer such that the heat-cured silicone is disposed between the first and second coated layers to form a layered assembly; and heating the layered assembly so as to cure the heat-cured silicone adhesive such that a bag-like structure is created.

It is to be understood that both the foregoing general description and the following detailed descriptions are exemplary and explanatory only, and are not restrictive of the invention as claimed.

BRIEF DESCRIPTION OF THE DRAWINGS

The features, aspects and advantages of the present invention will become apparent from the following description, appended claims, and the accompanying exemplary embodiments shown in the drawings, which are briefly described below.

FIGS. 7A-7E show the steps of manufacturing the airbag according to an embodiment of the present invention.

DETAILED DESCRIPTION

Herein below, embodiments of the present invention will be explained with reference to the drawings.

Figure 1:
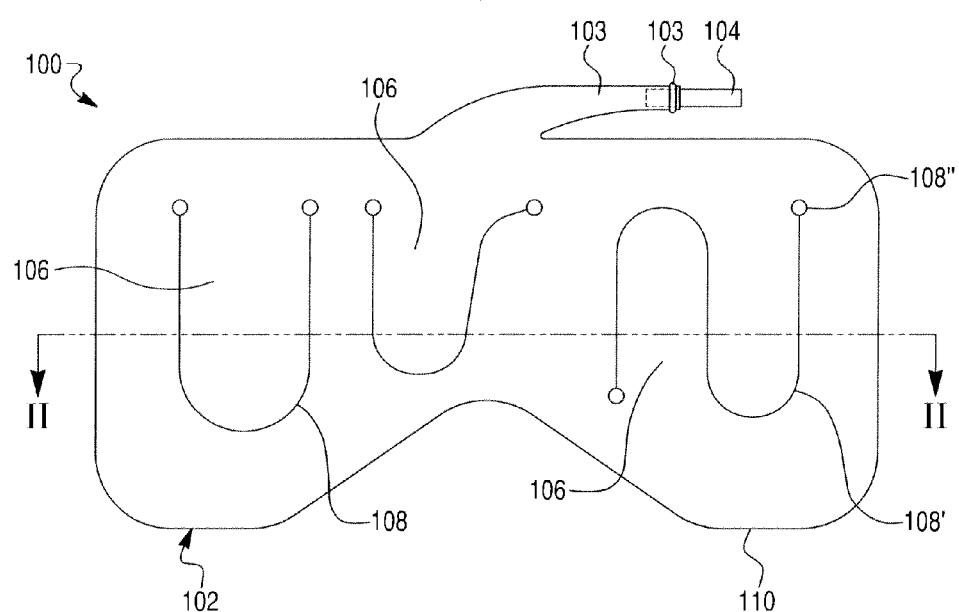
FIG. 1 shows an occupant safety module according to an embodiment of the present invention.

FIG. 1 shows an occupant safety module 100 according to an embodiment of the present invention. The occupant safety module 100 may comprise a curtain airbag 102 and a gas inflator 104 in fluid communication with the airbag 102. The gas inflator may be connected via one, two or more wires to a controller. The controller may detect the occurrence of the crash event (through one or more detectors), determine whether the airbag 102 should be deployed, and send a signal or command to the inflator to activate gas generation such that the airbag is deployed.

The gas inflator may be attached to the airbag 102 by being inserted into an inlet 103 of the airbag and securely fastened using a band 105. The airbag may comprise inflatable portions 106 that are bordered by internal seams 108 and one or more external seams 110 that define the outer periphery of the airbag. The internal seams may take any desirable shape such as curved lines 108' or circular connection points 108". The curtain airbag 100 may be used to protect one or more occupants from impacting the side walls and windows of the vehicle or to prevent the occupant from being thrown out of the vehicle. The vehicle in which the airbag and occupant safety module is installed may be a car, a plane, a train, or any other type of transportation. Although a curtain airbag is shown in FIG. 1, the airbag may take other forms such as a driver side airbag, a passenger side airbag or the like.

Figure 2:
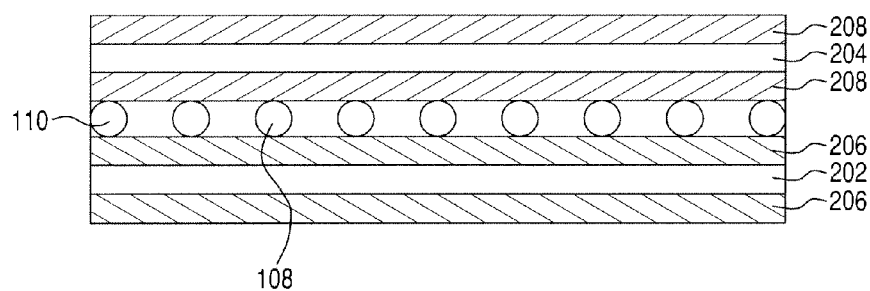
FIG. 2 shows a cross section of the airbag of FIG. 1 along sectional line II-II according to one embodiment of the present invention.

FIG. 2 shows a cross section of the airbag 102 of FIG. 1. The airbag 102 may comprise a first fabric layer 202 coated with a first silicone elastomer coating 206; a second fabric layer 204 coated with a second silicone elastomer coating 208; and a heat-cured silicone adhesive that makes up the seams 108 and 110. The heat-cured silicone adhesive forms a seam-bond between the first and second layers such that a bag-like structure is created.

The first and second fabric layers 202 and 204 may be the same type of fabric or different types of fabric. For example, the first and second layers may be made from Nylon weave (such as Nylon-6,6 (PA66)), a polyester weave, or the like.

Figure 3:
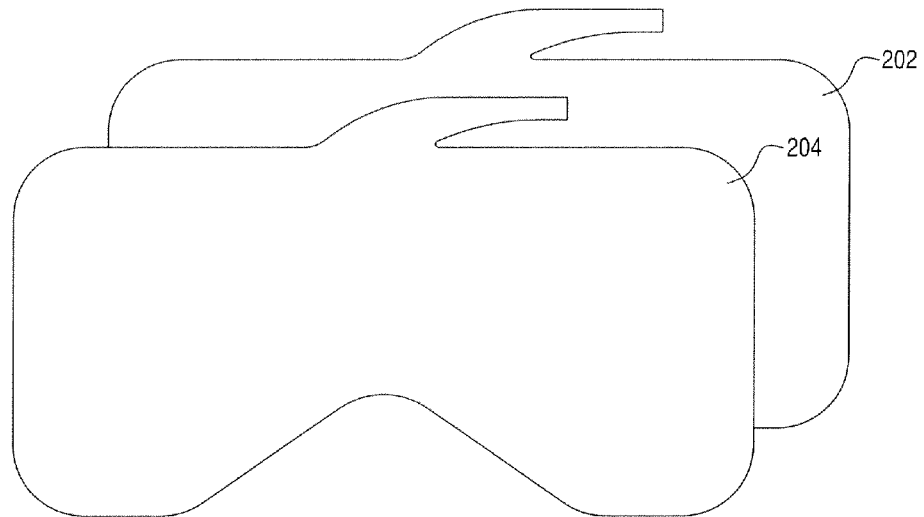
FIG. 3 shows two fabric layers before assembly according to one embodiment of the present invention.
Figure 4:
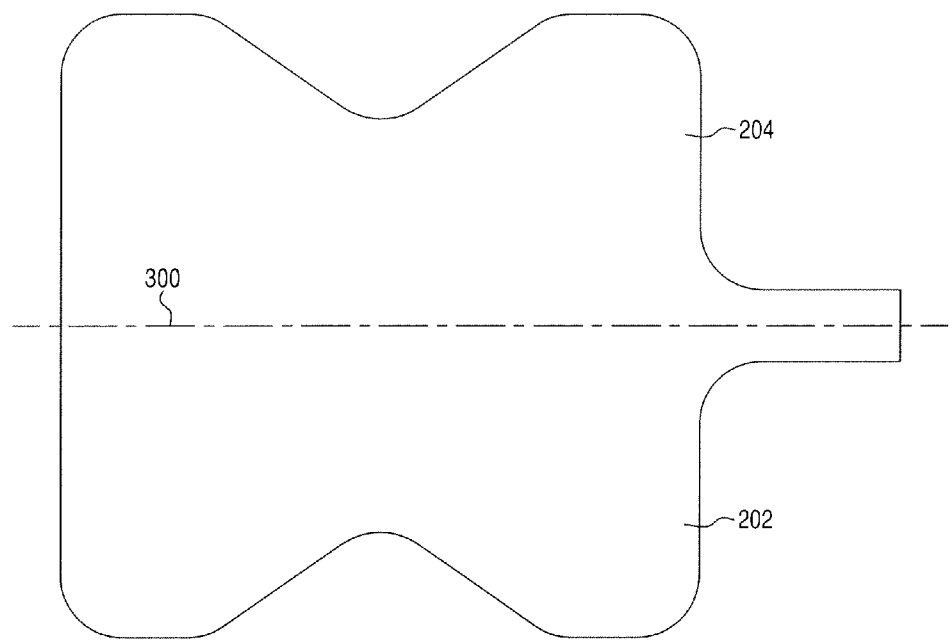
FIG. 4 shows two fabric layers before assembly according to another embodiment of the present invention.

The first and second fabric layers may be two distinct and separate layers that are substantially the same shape in which one is disposed on top of the other, as seen in FIG. 3. Alternatively, as seen in FIG. 4, the first and second layers may constitute on larger sheet of material in which the first and second layers may be mirror images of each other along a centerline 300. In this case, the larger sheet is folded along the centerline 300 such that one side of the material (the second layer 204) is placed on top of the other side of the material (the first layer 202).

Figure 5:
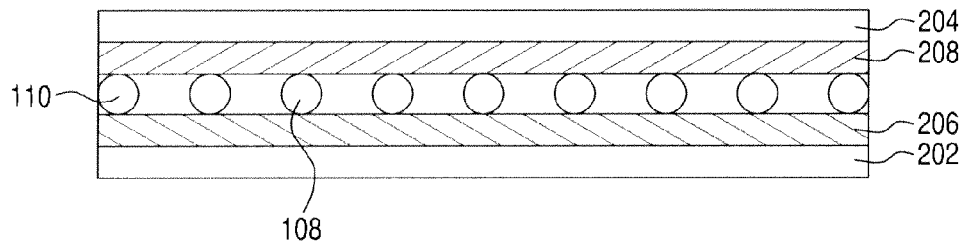
FIG. 5 shows a cross section of the airbag of FIG. 1 along sectional line II-II, according another embodiment of the present invention.

The first and second silicone elastomer coatings 206 and 208 are applied to the first and second fabric layers. The first and second coatings may be the same type of coating or different types of coating. For example, the first and second silicone elastomer coatings may be comprise a synthetic rubber, such as liquid silicone rubber, because of its high heat resistance, low gas-permeability, and high non flammability. The first and second silicone elastomer coatings do not necessarily have to be on both sides of their respective fabric layer. For example, FIG. 5 shows an alternative embodiment of the present invention in which the first and second silicone elastomer coatings 206 and 208 are only provided on the side of the first and second fabric layers that face each other.

The heat-cured silicone adhesive that forms the internal and external seams 108 and 110 may directly adhere to the first coated fabric layer 202 and the second coated fabric layer 204. For example, the internal and external seams 108 and 110 may directly adhere to the first and second silicone elastomer coatings 206 and 208 disposed on the fabric layers 202 and 204. Upon curing, the adhesive will provide a gas-impermeable bond with the first and second coatings 206 and 208 so as to provide the seam-bonds with a sealing function. The heat-cured silicone adhesive may be an addition-cure type with a platinum hydrosilation chemistry and may have a low energy modulus over a wide range of temperatures such that the adhesive and airbag formed by the fabric layers absorb the energy of the vehicle occupant as the occupant is caused to move forward due to forward momentum during the crash event.

Table 1 provides information related to the bonded tensile strength of the bonding between two layers of silicone rubber coated Nylon PA 6,6 fabric using a heat-cured silicone adhesive according to one embodiment of the present invention. The layers are two-inch width samples. Additional desirable and optional properties of the heat-cured silicone adhesive and airbag are provided in Table 2.

TABLE 1

| Bonded Tensile Strength (Energy Absorbed) | | | |
|---|---|---|---|
| | | 12 in/min pull speed | 1 meter/sec pull speed |
| Initial | Warp | 120 lbs min. | (34 Nm min.) |
| | Fill | 120 lbs min. | (34 Nm min.) |
| Heat-Aged 1000 hrs @ 110° C. | Warp | 96 lbs min. | (27 Nm min.) |
| | Fill | 96 lbs min. | (27 Nm min.) |
| Heat-Aged 2000 hrs @ 110° C. | Warp | 96 lbs min. | (27 Nm min.) |
| | Fill | 96 lbs min. | (27 Nm min.) |
| Heat-Aged 3000 hrs @ 110° C. | Warp | 96 lbs min. | (27 Nm min.) |
| | Fill | 96 lbs min. | (27 Nm min.) |
| Heat-Aged 1000 hrs @ 50° C./95% RH | Warp | 96 lbs min. | (27 Nm min.) |
| | Fill | 96 lbs min. | (27 Nm min.) |
| Heat-Aged 2000 hrs @ 50° C./95% RH | Warp | 96 lbs min. | (27 Nm min.) |
| | Fill | 96 lbs min. | (27 Nm min.) |
| Heat-Aged 3000 hrs @ 50° C./95% RH | Warp | 96 lbs min. | (27 Nm min.) |
| | Fill | 96 lbs min. | (27 Nm min.) |
| Heat-Aged 1000 hrs @ 70° C./95% RH | Warp | 96 lbs min. | (27 Nm min.) |
| | Fill | 96 lbs min. | (27 Nm min.) |
| Heat-Aged 2000 hrs @ 70° C./95% RH | Warp | 96 lbs min. | (27 Nm min.) |
| | Fill | 96 lbs min. | (27 Nm min.) |
| Heat-Aged 3000 hrs @ 70° C./95% RH | Warp | 96 lbs min. | (27 Nm min.) |
| | Fill | 96 lbs min. | (27 Nm min.) |

TABLE 2

| Additional Desired Properties for the Heat-Cured Silicone Adhesive and Airbag | |
|---|---|
| Appearance | Neutral/clear preferred but pink pigment is acceptable |
| Maximum Cure/Application Temperature | <190° C. (<175° C. preferred) |
| Application Method | <5 minutes per airbag (<2 minutes per airbag preferred) |
| Rheology | Easy flow (pneumatic, extrusion, hot melt) - minimum speed of room temperature-cure sealant is desired |
| Composition | Metered 2-part composition is acceptable (primer permitted if necessary) |
| Post-process dimensions for the airbag | <+/−3 mm tolerance (e.g., for a 2.4 × 0.65 m² airbag) |
| Adhesive Thickness | 1 mm maximum (less than 1 mm is preferred) |
| Adhesive Width | 10 mm maximum |
| Green Strength | Allow bag-folding less than 24 hrs (a few hours maximum preferred) |
| 90% + cure (JIT shipment) | Less than 24 hrs. (less than 4-8 hrs. preferred) |
| Adhesion Failure Mode | 100% cohesive preferred |
| Flammability of the airbag | FMVSS 302 |
| Fogging | <5% by wt (onto glass plate surfaces) |
| Folding of the airbag | 2 layers fabric folded 5-in × 1-in increments under 5-lb/sq. in., heat-aged 1000 hrs @ 110° C., >80% original bond strengths |
| Cold impact | −35° F. (no cold cracking, flaking, peeling) |
| Cold/Heat Cycle | −30 to +80° C. in 24 hrs. (50 and 100 cycles) |
| Shelf Life | 6 months minimum, refrigeration is acceptable |
| Pot Life | Limit is robotic metering/application |

TABLE 2-continued

Additional Desired Properties for the Heat-Cured Silicone Adhesive and Airbag

| | |
|---|---|
| EHS | Must comply with ELV SPECs, anticipate VDA 278 volatiles [EU] |

Figure 6:
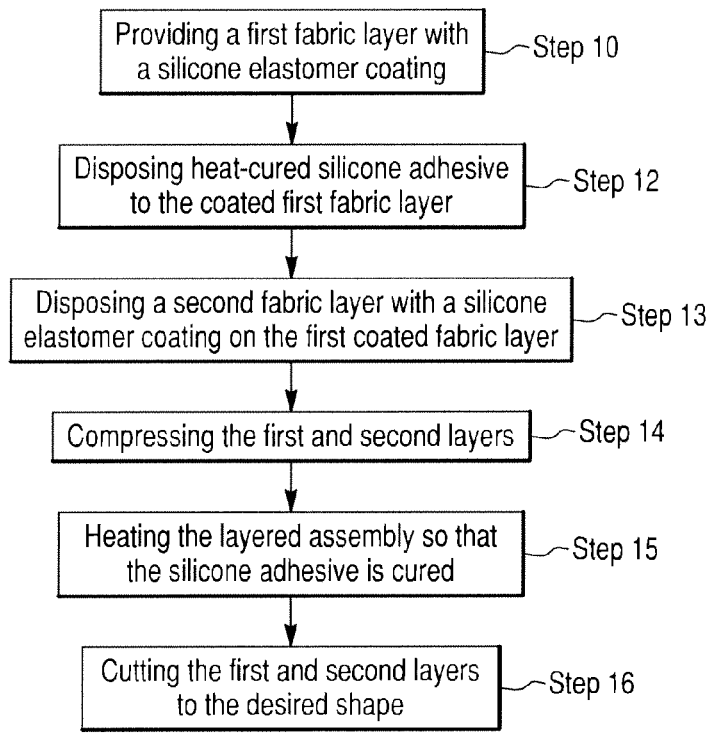
FIG. 6 shows a flow chart used to manufacture an airbag according to an embodiment of the present invention.

Now, the method of manufacturing the airbag according to one embodiment of the present invention will now be described in relation to the flow chart of FIG. 6 and the depicted steps in FIGS. 7A-7E. In step 10, the first fabric layer 202 is provided which has the first silicone elastomer coating as seen in FIG. 7A. The first fabric layer 202 may be cut into its final shape before assembly, as seen in FIG. 3, or may simply be rectangular (or other arbitrary shape), as seen in FIG. 7A, that will need to be cut into its final shape after the curing process in optional step 16.

In step 12, the heat cured silicone adhesive 400 is disposed on the coated first fabric layer at the locations where seams 108 and 110 are desired as seen in FIG. 7B. The heat cured silicone adhesive may be applied by a pneumatic gun as a bead, such as a 3 mm bead. No primer is required for this step as the silicone adhesive readily adheres to the silicone elastomer coating upon curing.

In step 13, the second fabric layer 204 with the second silicone elastomer coating is disposed on the first coated fabric layer (as seen in FIG. 7C) such that the second coated fabric layer 204 is in contact with the first coated fabric layer 202 with the heat cured silicone adhesive disposed between the two layers so as to form a layered assembly 600. The layered assembly 600 is then pre-pressed in step 14 so as to optimize the contact between each coated layer and the silicone adhesive. The compression of the layered assembly may be accomplished manually, by the use of compression plates 502 of a platen press 500, or other any other automated process.

In step 15, the layered assembly 600 is then heated while being compressed by the platen press 500, as seen in FIG. 7D. Thermal energy or heat is conducted through the compression plates 502 to the layered assembly. The silicone adhesive 400 is cured by the heating process so that the silicone adhesive creates a gas-impermeable bond with the silicone coatings of the first and second fabric layers by penetrating into the silicone coatings so that their interfaces intertwine with each other. The temperature and pressure applied by the platen press as well as the amount of heating time can be adjusted depending on the silicone adhesive. For example, the heating process may last for about 10 minutes or less, for example about 1, 2, 4, 5, or 6 minutes. However, the preferred heating time is about 3 minutes or less. The temperature setting of the platen press may be in the range of about 150 to about 190° C., but the preferred temperature range is between about 160 to 170° C. The pressure setting of the platen press may be such so as to provide good intimate contact between the silicone adhesive and the first and second coated fabric layers.

After the heating/curing process, the airbag is removed from the platen press, as seen in FIG. 7E. Note that the dashed lines 700 indicate the placement of the seam-bonds that are comprised of the silicone adhesive. In an optional step 16, the airbag may need to be cut to its final shape. The cutting step may be accomplished manually or automatically by using, for example a cutting machine, such as a press with a cutting die.

Figure 8:
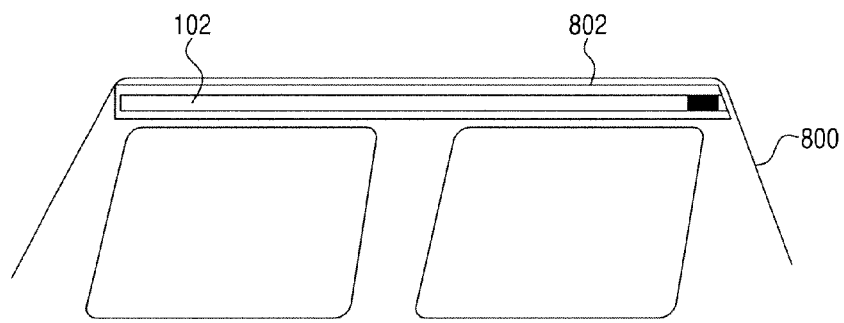
FIG. 8 shows a schematic diagram of the installation of the occupant safety system installed in a vehicle according to an embodiment of the present invention.

After the assembly of the airbag, a gas inflator 101 may be attached to the airbag before or after the installation of the occupant safety module 100 in the vehicle. As seen in FIG. 8, the airbag 102 is folded or rolled up and mounting into a storage compartment 802 located in the roof of the motor vehicle 800. The airbag 102 may also be stored in other storage compartments, such as in the occupant's seat cushion, the occupant's seatback, the steering wheel, the dashboard, or any other suitable location.

Thus, a heat cured silicone adhesive is disclosed for bonding a silicone-coated airbag fabric layer to another silicone-coated airbag fabric layer. The silicone adhesive may be applied to the airbag surface by a pneumatic gun and the 2-layer airbag is then heated under a platen press to enact a quick-cure process of intertwining the silicone adhesive with the silicone coating disposed onto two fabric layers of the airbag. Also, the above disclosure provides the advantage of simplifying the manufacturing process by decreasing the amount of curing time for the elastomeric sealant from 24 hours (as used in conventional sealants) to about less than 3 minutes.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A method of manufacturing an airbag, comprising:
providing a first fabric layer coated with a first silicone elastomer coating;
applying a heat-cured silicone adhesive to the first fabric layer;
providing a second fabric layer coated with a second silicone elastomer coating on the coated first fabric layer such that the heat-cured silicone is disposed between the first and second coated layers to form a layered assembly; and
heating the layered assembly so as to cure the heat-cured silicone adhesive such that a bag structure is created,
wherein the heat-cured silicone adhesive is applied such that the heat-cured silicone adhesive forms one or more external seams that define an outer periphery seam of the bag structure and forms at least one internal seam within the outer periphery of the bag structure.

2. The method of manufacturing an airbag according to claim 1, wherein the heat-cured silicone adhesive directly adheres to the first coated fabric layer and the coated second fabric layer.

3. The method of manufacturing an airbag according to claim 1, wherein the heat-cured silicone adhesive has sufficient strength such that the bag structure does not rupture upon deployment of the airbag in an event of a crash.

4. The method of manufacturing an airbag according to claim 1, wherein the first and second coated fabric layers are solely attached to each other by the heat-cured silicon adhesive.

5. The method of manufacturing an airbag according to claim 1, wherein the heat-cured silicone adhesive is an addition-cure type with a platinum hydrosilation chemistry.

6. The method of manufacturing an airbag according to claim 1, wherein the layered assembly is heated for about 10 minutes or less.

7. The method of manufacturing an airbag according to claim 6, wherein the layered assembly is heated for about 3 minutes or less.

8. A method of manufacturing an airbag, comprising:

providing a first fabric layer coated with a first silicone elastomer coating;

applying a heat-cured silicone adhesive to the first fabric layer;

providing a second fabric layer coated with a second silicone elastomer coating on the coated first fabric layer such that the heat-cured silicone is disposed between the first and second coated layers to form a layered assembly; and heating the layered assembly so as to cure the heat-cured silicone adhesive such that a bag structure is created with the heat-cured silicon adhesive forming a seam, wherein the heat-cured silicone adhesive, after curing, has sufficient strength such that the bag structure does not rupture at the seam upon deployment of the airbag in an event of a crash.

9. The method of manufacturing an airbag according to claim 8, wherein the heat-cured silicone adhesive directly adheres to the first coated fabric layer and the coated second fabric layer.

10. The method of manufacturing an airbag according to claim 8, wherein the first and second coated fabric layers are solely attached to each other by the heat-cured silicon adhesive.

11. The method of manufacturing an airbag according to claim 8, wherein the heat-cured silicone adhesive is an addition-cure type with a platinum hydrosilation chemistry.

12. The method of manufacturing an airbag according to claim 8, wherein the layered assembly is heated for about 10 minutes or less.

13. The method of manufacturing an airbag according to claim 8, wherein the layered assembly is heated for about 3 minutes or less.

* * * * *